US012292534B2

(12) United States Patent
Wilkerson et al.

(10) Patent No.: US 12,292,534 B2
(45) Date of Patent: May 6, 2025

(54) LiDAR SYSTEMS FOR NEAR-FIELD AND FAR-FIELD DETECTION, AND RELATED METHODS AND APPARATUS

(71) Applicant: VELODYNE LIDAR USA, INC., San Jose, CA (US)

(72) Inventors: Nathan Wilkerson, San Jose, CA (US); Mathew Noel Rekow, Alameda, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1002 days.

(21) Appl. No.: 17/306,885

(22) Filed: May 3, 2021

(65) Prior Publication Data

US 2022/0350000 A1  Nov. 3, 2022

(51) Int. Cl.
*G01S 7/48* (2006.01)
*G01S 7/481* (2006.01)
*G01S 7/4865* (2020.01)
*G01S 17/10* (2020.01)
*G02B 26/08* (2006.01)
*G02B 26/10* (2006.01)

(52) U.S. Cl.
CPC .......... *G01S 7/4815* (2013.01); *G01S 7/4817* (2013.01); *G01S 7/4865* (2013.01); *G01S 17/10* (2013.01); *G02B 26/0816* (2013.01); *G02B 26/10* (2013.01)

(58) Field of Classification Search
USPC ....................................................... 356/5.01
See application file for complete search history.

(56) References Cited

U.S. PATENT DOCUMENTS

| 9,897,700 | B2* | 2/2018 | Wee .................... G01S 17/87 |
| 11,460,642 | B2* | 10/2022 | Hu ........................ G02B 6/34 |
| 11,536,847 | B2* | 12/2022 | Milkov ............... G01S 17/931 |
| 11,726,184 | B2* | 8/2023 | Ferreira ............ H04N 25/773 |
|  |  |  | 356/4.01 |
| 11,789,149 | B2* | 10/2023 | Koonath ............ G01S 7/481 |
|  |  |  | 356/5.14 |
| 2012/0242972 | A1* | 9/2012 | Wee ..................... G01S 17/931 |
|  |  |  | 356/4.01 |
| 2017/0372602 | A1* | 12/2017 | Gilliland .............. G01S 17/86 |
| 2019/0079165 | A1 | 3/2019 | Retterath et al. |

(Continued)

FOREIGN PATENT DOCUMENTS

WO  2021065138 A1  4/2021

OTHER PUBLICATIONS

Written Opinion of the International Search Authority for PCT/US2022/027494 (Year: 2023).*

(Continued)

*Primary Examiner* — James R Hulka
(74) *Attorney, Agent, or Firm* — Kilpatrick Townsend & Stockton LLP

(57) ABSTRACT

A light detection and ranging (LiDAR) method may include generating, by a first transmitter, a first light illumination signal; generating, by a second transmitter, a second light illumination signal; receiving first return signals corresponding to the first light illumination signal; receiving second return signals corresponding to the second light illumination signal; and sampling the first return signals or the second return signals during a short-range sampling period, such that the short-range sampling period avoids a period of dazzle.

10 Claims, 11 Drawing Sheets

(56) References Cited

U.S. PATENT DOCUMENTS

| | | | |
|---|---|---|---|
| 2020/0041614 A1* | 2/2020 | Donovan | G01S 7/4816 |
| 2020/0158861 A1 | 5/2020 | Cattle et al. | |
| 2020/0284883 A1* | 9/2020 | Ferreira | H04N 25/773 |
| 2021/0132229 A1* | 5/2021 | Milkov | G01S 7/4863 |
| 2022/0107411 A1* | 4/2022 | Koonath | G01S 17/58 |
| 2022/0221652 A1* | 7/2022 | Hu | G02B 6/2931 |

OTHER PUBLICATIONS

PCT/US2022/027494, "International Search Report and Written Opinion", Apr. 4, 2023, 12 pages.
Application No. EP22838188.5, Extended European Search Report, Mailed On Jan. 27, 2025, 9 pages.

\* cited by examiner

LiDAR SYSTEMS FOR NEAR-FIELD AND FAR-FIELD DETECTION, AND RELATED METHODS AND APPARATUS

FIELD OF TECHNOLOGY

The present disclosure relates generally to light detection and ranging ("LiDAR") technology and, more specifically, to LiDAR systems for detecting objects in both the near and far fields.

BACKGROUND

Light detection and ranging ("LiDAR") systems measure the attributes of their surrounding environments (e.g., shape of a target, contour of a target, distance to a target, etc.) by illuminating the target with pulsed laser light and measuring the reflected pulses with sensors. Differences in laser return times and wavelengths can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), and so forth. Depending on the application and associated field of view (FOV), multiple channels or laser beams may be used to produce images in a desired resolution. A LiDAR system with greater numbers of channels can generally generate larger numbers of pixels.

In a conventional multi-channel LiDAR device, optical transmitters are paired with optical receivers to form multiple "channels." In operation, each channel's transmitter emits an optical (e.g., laser) illumination signal into the device's environment and each channel's receiver detects the portion of the return signal that is reflected back to the receiver by the surrounding environment. In this way, each channel provides "point" measurements of the environment, which can be aggregated with the point measurements provided by the other channel(s) to form a "point cloud" of measurements of the environment.

Advantageously, the measurements collected by any LiDAR channel may be used, inter alia, to determine the distance (i.e., "range") from the device to the surface in the environment that reflected the channel's transmitted optical signal back to the channel's receiver. The range to a surface may be determined based on the time of flight (TOF) of the channel's signal (e.g., the time elapsed from the transmitter's emission of the optical (e.g., illumination) signal to the receiver's reception of the return signal reflected by the surface).

In some instances, LiDAR measurements may also be used to determine the reflectance of the surface that reflects an optical (e.g., illumination) signal. The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

SUMMARY

Disclosed herein are LiDAR systems for near-field and far-field detection, and related methods and apparatus. In a first aspect, a light detection and ranging (LiDAR) method for near-field detection includes generating, by a first transmitter, a first light illumination signal; generating, by a second transmitter, a second light illumination signal; receiving first return signals corresponding to the first light illumination signal; receiving second return signals corresponding to the second light illumination signal; and sampling the first return signals or the second return signals during a short-range sampling period, such that the short-range sampling period avoids a period of dazzle. In some applications, the short-range sampling period occurs before the dazzle signal is received, whereas, in other applications, the short-range sampling period occurs after a last return of the first return signals. Advantageously, each of the first return signal and the second return signal may be received by a common channel signal detector. Optionally, the method may also include diffusing, using a diffuser, at least one of the first light signal and the second light signal.

In a second aspect, a light detection and ranging (LiDAR) system includes a first transmitter, a second transmitter, and a receiver. In some embodiments, the first transmitter is adapted to generate and emit a first light illumination signal towards a medium-range scan area and/or a long-range scan area, and the receiver is adapted to detect and receive first return signals corresponding to the first light illumination signal; the second transmitter is adapted to generate and emit a second light illumination signal towards at least one object in a short-range scan area within a near field, wherein the receiver is further adapted to receive second return signals corresponding to the second light illumination signal.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
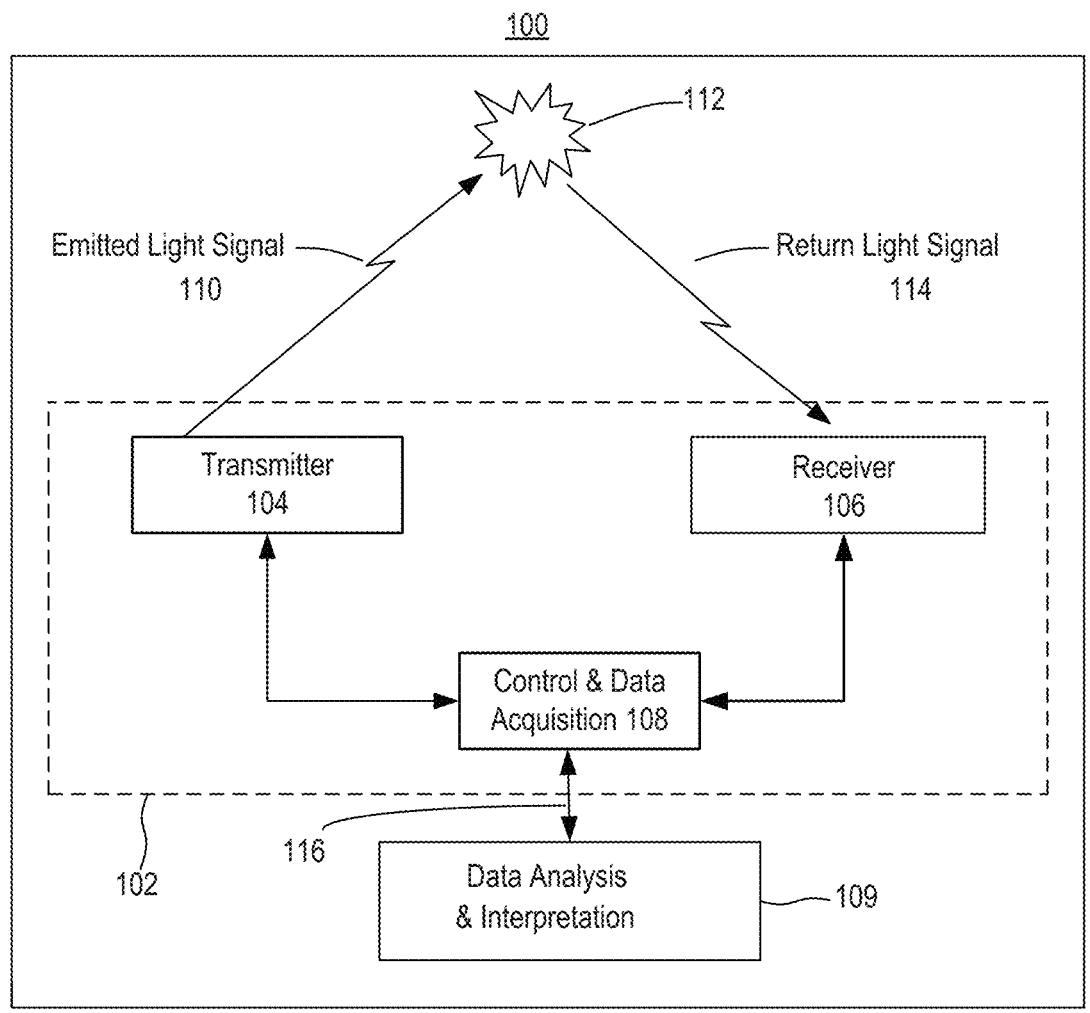
FIG. 1 shows an illustration of an exemplary LiDAR system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for LiDAR-based near-field and far-field detection are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Motivation for and Benefits of Some Embodiments

Problematically, conventional LiDAR devices that are capable of medium- to long-range detection of objects in the far field are not capable of high-quality short-range detection of objects in the near field. Furthermore, during a brief time period occurring shortly after a conventional LiDAR device transmits the ranging (e.g., illumination) signal, the LiDAR detector may be blinded by "dazzle." Dazzle refers to a phenomenon whereby the channel receiver detects (and is blinded by) portions of the transmitted ranging (e.g., illumination) signal that have not been reflected by objects external to the LiDAR device. In some instances, dazzle may be caused by one or more of: leakage of the transmitted ranging signal within or between channels, partial reflection of the transmitted signals by the window, blockage on the window through which the ranging (e.g., illumination) signals are meant to be transmitted, back reflection of the ranging (e.g., illumination) signals by a lens or other optical device, and the like. Disadvantageously, conventional LiDAR devices are unable to discern return signals reflected back to the channel receivers from short-range objects located in the near field (e.g., objects within a few meters (1-2 meters)) due to the presence of dazzle.

Figure 8:
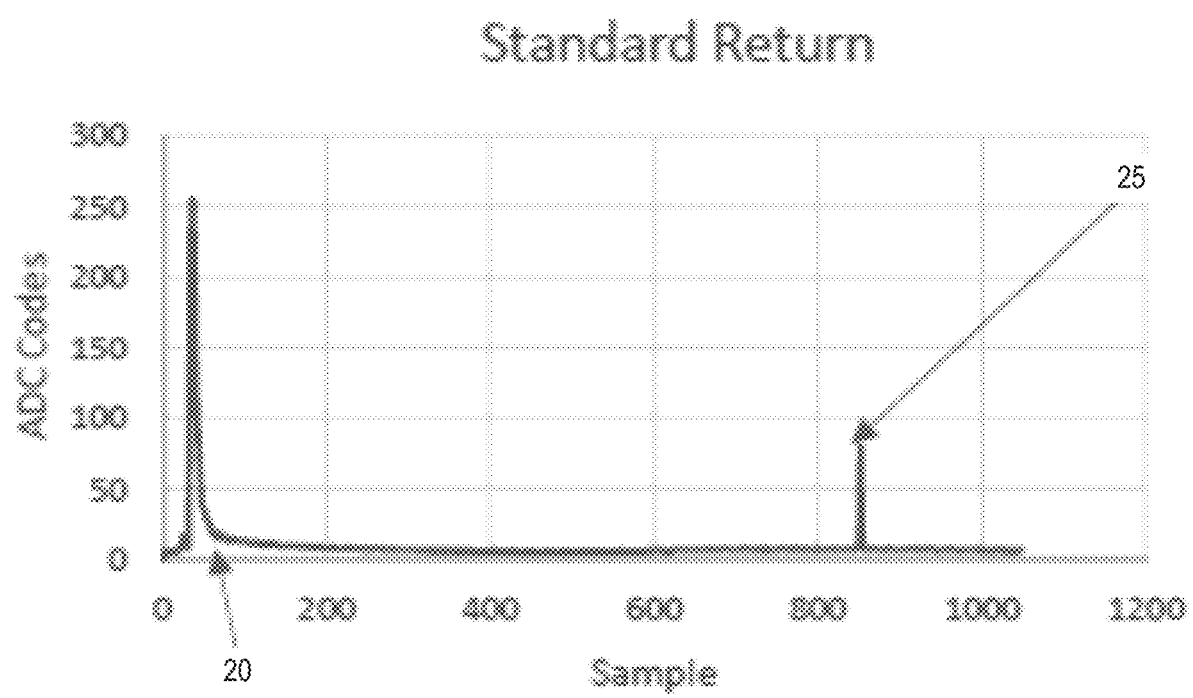
FIG. 8 shows the relationship between dazzle and received (e.g., imaging) signals in accordance with the prior art.

Referring to FIG. 8, the relationship between the received dazzle 20 and a return signal 25 reflected by an object in the near field is shown. Disadvantageously, the dazzle 20 typically occurs concurrently as shorter-range return signals arrive at the LiDAR detectors, essentially blinding them, preventing the LiDAR detectors from detecting the return signals.

Accordingly, it would be desirable to provide a (e.g., solid-state) LiDAR system that is structured and arranged to provide short-range detection of objects in the near field and, moreover to provide short-, medium-, and long-range detection data concurrently.

Terminology

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Exemplary LiDAR Systems

A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits (e.g., illumination) light (e.g., laser) pulses that are subsequently reflected by objects within the environment in which the system operates. The time each pulse travels from being emitted to being received (i.e., time-of-flight) may be measured to determine the distance between the LiDAR system and the object that reflects the pulse. The science of LiDAR systems is based on the physics of light and optics.

In a LiDAR system, (e.g., illumination) light may be emitted from a rapidly firing laser. Laser (e.g., illumination) light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 depicts the operation of the medium- and long-range portion of an exemplary LiDAR system 100, according to some embodiments. In the example of FIG. 1, the LiDAR system 100 includes a LiDAR device 102, which may include a transmitter 104 that is configured to generate and transmit an emitted (e.g., illumination) light signal 110, a receiver 106 that is configured to detect a return light signal 114, and a control & data acquisition module 108. The transmitter 104 may include a light source (e.g., laser), electrical components operable to activate ("drive") and deactivate the light source in response to electrical control signals, and optical components adapted to shape and redirect the light emitted by the light source. The receiver 106 may include an optical detector (e.g., photodiode) and optical components adapted to shape return light signals 114 and direct those signals to the detector. In some implementations, one or more of optical components (e.g., lenses, mirrors, etc.) may be shared by the transmitter and the receiver. The LiDAR device 102 may be referred to as a LiDAR transceiver or "channel." In operation, the emitted (e.g., illumination) light signal 110 propagates through a medium and reflects off an object(s) 112, whereby a return light signal 114 propagates through the medium and is received by receiver 106.

The control & data acquisition module 108 may be adapted to control the light emission by the transmitter 104 and may record data derived from the return light signal 114 detected by the receiver 106. In some embodiments, the control & data acquisition module 108 is further adapted to control the power level at which the transmitter 104 operates when emitting (e.g., illumination) light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some variations, the control & data acquisition module 108 may be adapted to determine (e.g., measure) particular characteristics of the return light signal 114 detected by the receiver 106. For example, the control & data acquisition module 108 may be configured to measure the intensity of the return light signal 114 using any suitable technique.

A LiDAR transceiver 102 may include one or more optical lenses and/or mirrors (not shown) to transmit and shape the emitted (e.g., illumination) light signal 110 and/or to redirect and shape the return light signal 114. For example, the transmitter 104 may emit a laser beam having a plurality of pulses in a particular sequence. Design elements of the receiver 106 may include its horizontal field of view (hereinafter, "FOX") and its vertical FOV. One skilled in the art will recognize that the FOV parameters effectively define the visibility region relating to the specific LiDAR transceiver 102. More generally, the horizontal and vertical FOVs of a LiDAR system 100 may be defined by a single LiDAR device (e.g., sensor) or may relate to a plurality of configurable sensors (which may be exclusively LiDAR sensors or may have different types of sensors). The FOV may be considered a scanning area for a LiDAR system 100. A scanning mirror may be utilized to obtain a scanned FOV.

In some implementations, the LiDAR system 100 may also include or may be electronically coupled to a data analysis & interpretation module 109, which may be adapted to receive output (e.g., via connection 116) from the control & data acquisition module 108 and, moreover, to perform data analysis functions on, for example, return signal data. The connection 116 may be implemented using a wireless or non-contact communication technique.

Figure 2A:
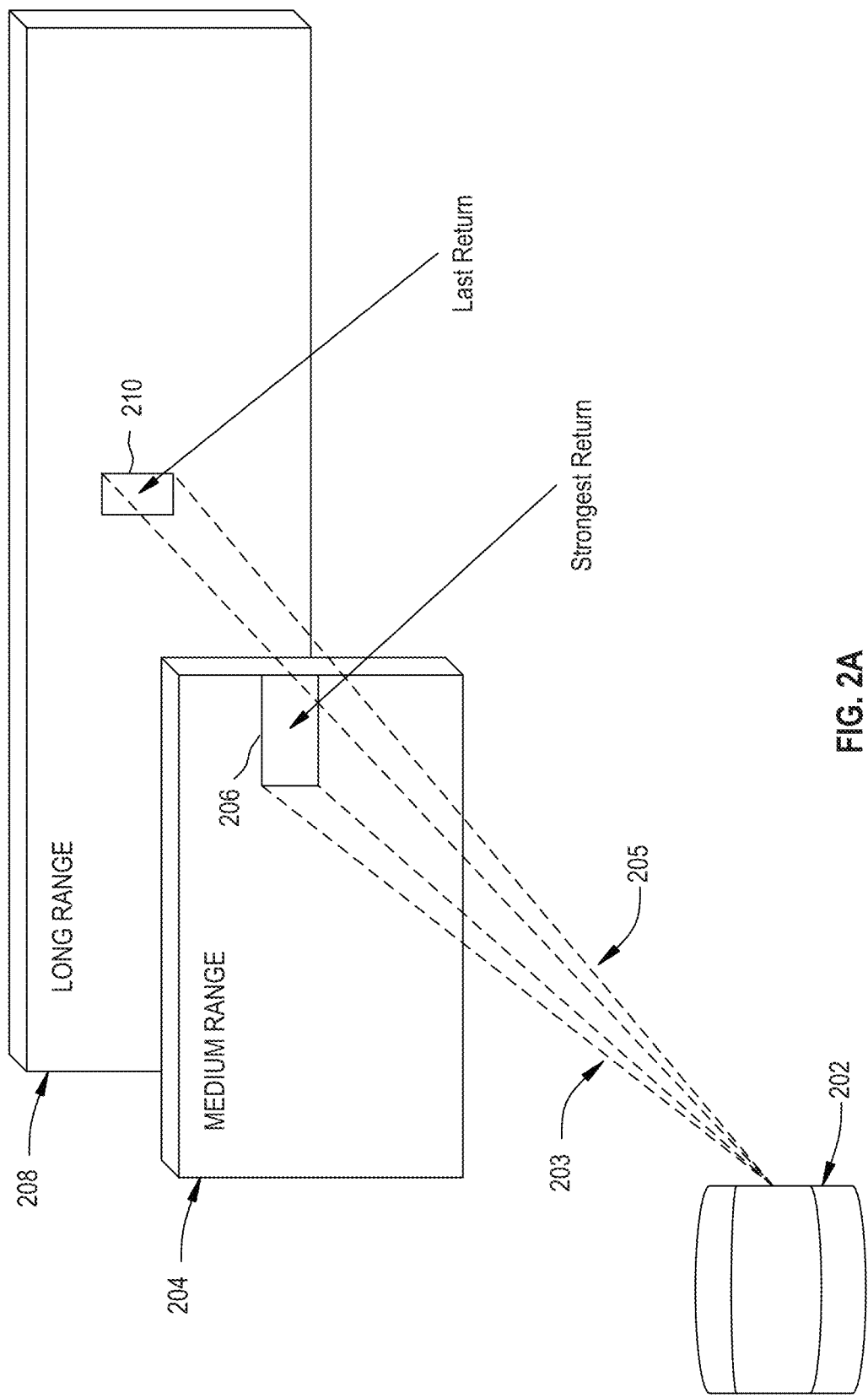
FIG. 2A shows an illustration of the operation of the LiDAR system of FIG. 1, in accordance with some embodiments.

FIG. 2A illustrates the operation of the medium- and long-range portion(s) of a LiDAR system 202, in accordance with some embodiments. In the example of FIG. 2A, two return light signals 203 and 205 are shown, corresponding to medium-range and long-range return signals. Laser beams generally tend to diverge as they travel through a medium. Due to the laser's beam divergence, a single (e.g., illumination) laser emission may hit multiple objects at different ranges from the LiDAR system 202, producing multiple return signals 203, 205. The LiDAR system 202 may analyze multiple return signals 203, 205 and report one of the return signals (e.g., the strongest return signal, the last return signal, etc.) 203, 205 or more than one (e.g., all) of the return signals 203, 205. In the illustrative example shown in FIG. 2A, LiDAR system 202 emits a (e.g., illumination) laser in the direction of medium-range wall 204 and long-range wall 208. As illustrated, the majority of the emitted (e.g., illumination) beam hits the medium-range wall 204 at area 206 resulting in a (e.g., medium-range) return signal 203, and another portion of the emitted (e.g., illumination) beam hits the long-range wall 208 at area 210 resulting in a (e.g., long-range) return signal 205. Return (e.g., medium-range) signal 203 may have a shorter TOF and a stronger received signal strength compared with return (e.g., long-range) signal 205. In both single- and multiple-return LiDAR systems 202, it is important that each return signal 203, 205 is accurately associated with the transmitted (e.g., illumination) light signal so that an accurate TOF may be calculated.

Some embodiments of a LiDAR system may capture distance data in a (e.g., single plane) two-dimensional (2D) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted (e.g., illumination) light from the transmitter (e.g., laser diode), and/or may reflect the return light to the detector. Use of a movable (e.g., oscillating) mirror in this manner may enable the LiDAR system to achieve 90-180-360 degrees of azimuth (horizontal) view while simplifying both the system design and manufacturability. Many applications require more data than just a single (e.g., 2D) plane. The 2D point cloud, however, may be expanded to form a 3D point cloud, in which multiple 2D point clouds are used, each pointing at a different elevation (i.e., vertical) angle. Design elements of the receiver of the LiDAR system 202 may include the horizontal FOV and the vertical FOV.

Figure 2B:
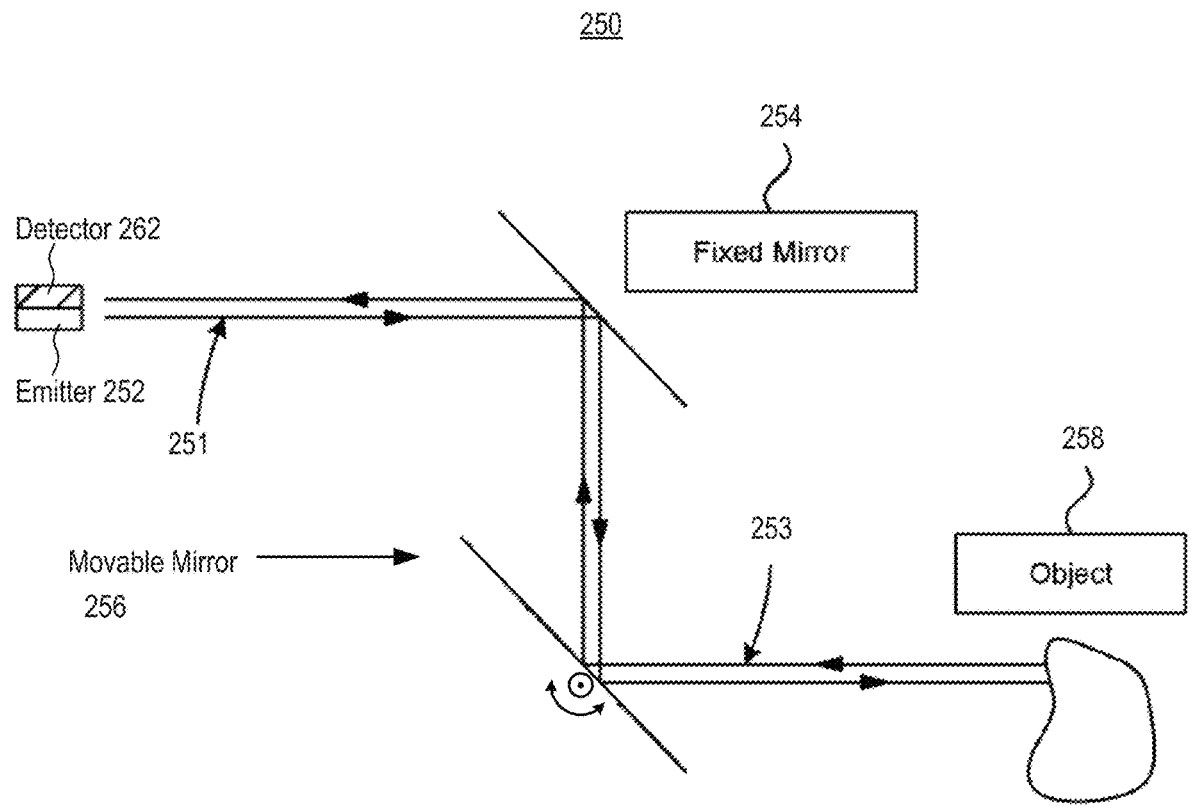
FIG. 2B shows an illustration of optical components of a channel of a LiDAR system, in accordance with some embodiments.

FIG. 2B depicts a set of optical components 250 of a channel 102 of a LiDAR system 100 according to some embodiments. In the example of FIG. 2B, the LiDAR channel 102 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. Design elements of the LiDAR system 250 include the horizontal FOV and the vertical FOV, which define a scanning area.

Hybrid LiDAR System

Figure 3A:
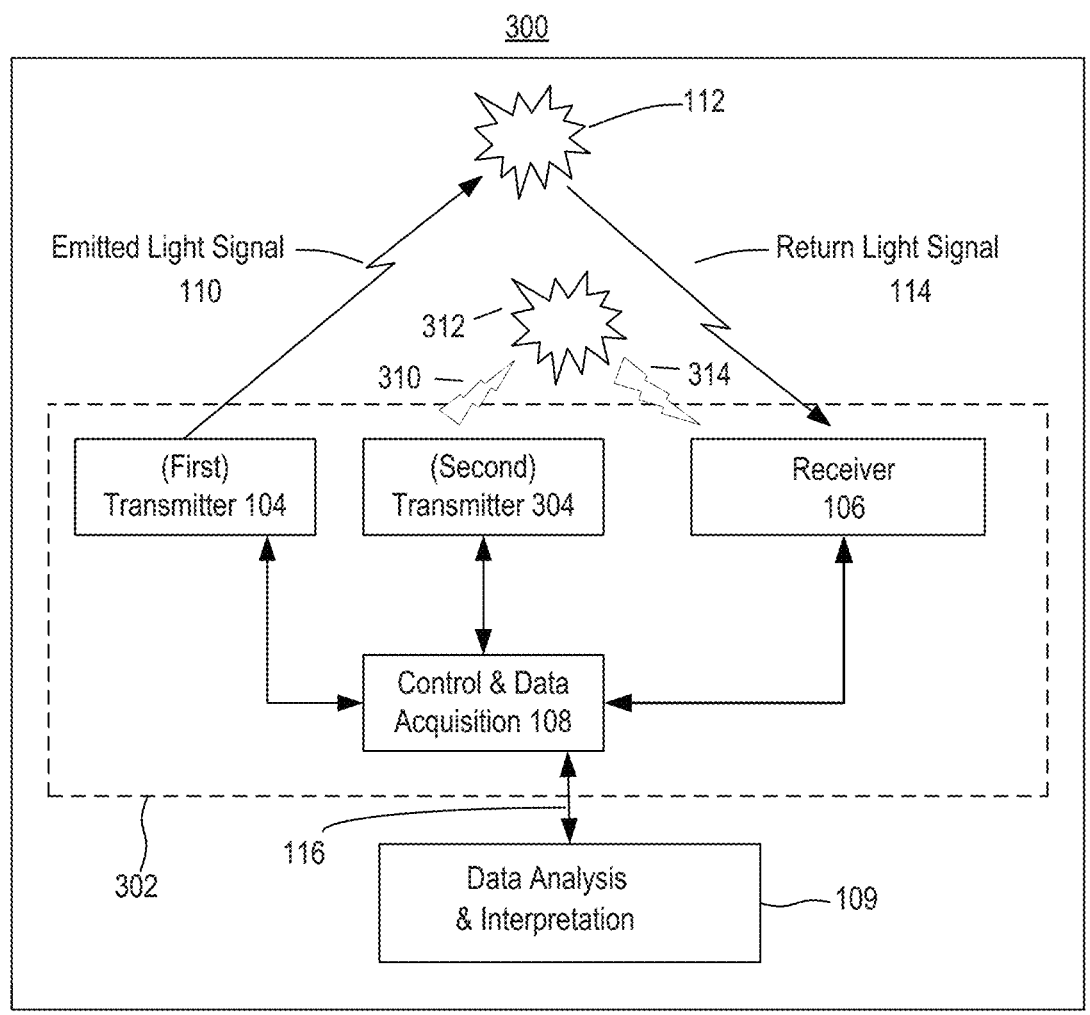
FIG. 3A shows a block diagram of a hybrid LiDAR system, in accordance with some embodiments.

Referring to FIG. 3A, a block diagram of an illustrative (e.g., hybrid) LiDAR system 300 that is structured and arranged to provide long-, medium-, and short-range detection in accordance with some embodiments is shown. Although the hybrid LiDAR system 300 will be described as part of a system that is capable of detecting and processing short-range return signals as well as medium- and long-range return signals, those skilled in the art can appreciate that a stand-alone system may be designed to detect and process only short-range return signals. In some implementations, the short-range components are capable of detecting objects in the range of about 10 to about 20 meters from the LiDAR system 300; although application of a diffuser 306 to the short-range illumination signals may limit the detection range to about 1 or 2 meters (or less).

In some variations, the hybrid LiDAR system 300 is a solid-state system that is structured and arranged to include a far-field transmitter 104 (e.g., "first," "primary," or "far-field" transmitter), a transmitter 304 (e.g., "second," "supplemental," "flash," or "near-field" transmitter), a receiver 106, a control & data acquisition module 108, and a data analysis & interpretation module 109. Collectively, the far-field transmitter 104, receiver 106, and control & data acquisition module 108 may be configured to operate as a far-field LiDAR device (e.g., channel), capable of providing data from medium- and long-range scan areas as previously described. In some implementations, the far-field transmitter 104 is configured to emit laser (e.g., illumination) light signals 110 towards a medium- and long-range scan area and to receive return signals 114 therefrom. In some embodiments, the light source of the far-field transmitter 104 may be a light-emitting diode (LED), an edge-emitting diode laser, a line laser having an edge emitter and a (e.g., fiber) filter, or any other light source suitable for transmitting illumination signals to the far field. In some embodiments, after being shaped by the optical components of the far-field transmitter 104, the emitted light signal 110 may be tightly focused (e.g., with divergence of less than 15 degrees, less than 10 degrees, less than 5 degrees, less than 2 degrees, or less than 1 degree), and may have a range of tens to hundreds of meters.

Collectively, the near-field transmitter 304, receiver 106, and control & data acquisition module 108 may be configured to operate as a near-field LiDAR device (e.g., channel), capable of providing data from short-range scan areas. In some applications, the near-field transmitter 304 is structured and arranged to generate and emit a (e.g., supplemental) laser (e.g., illumination) signal 310 that is capable of illuminating objects 312 in a short-range scan area located within the near field, such that the (e.g., short-range) return signals 314 may be received and detected by the receiver 106.

In some applications, the near-field transmitter 304 may be adapted to emit a short-range light (e.g., illumination) beam 310 to illuminate objects in the near field. The short-range beam (sometimes referred to herein as a "flash beam") may be significantly more diffuse and more divergent than the long-range light beam 110, such that the short-range beam's energy density decreases rapidly with distance and effective range is low (e.g., a few meters). In some embodiments, the near-field transmitter 304 includes one or more laser emitters each capable of emitting a (e.g., short-range) laser beam. In some variations, each of the emitters of the transmitter 304 may be a vertical-cavity surface-emitting lasers (VCSELs), a line laser having an edge emitter and a (e.g., fiber) filter, etc. In some embodiments, the short-range transmitter 304 may also include one or more diffusers adapted to shape the beams generated by the short-range transmitter 304 such that they fill the horizontal and vertical FOV of the LiDAR device 300.

Figure 3B:
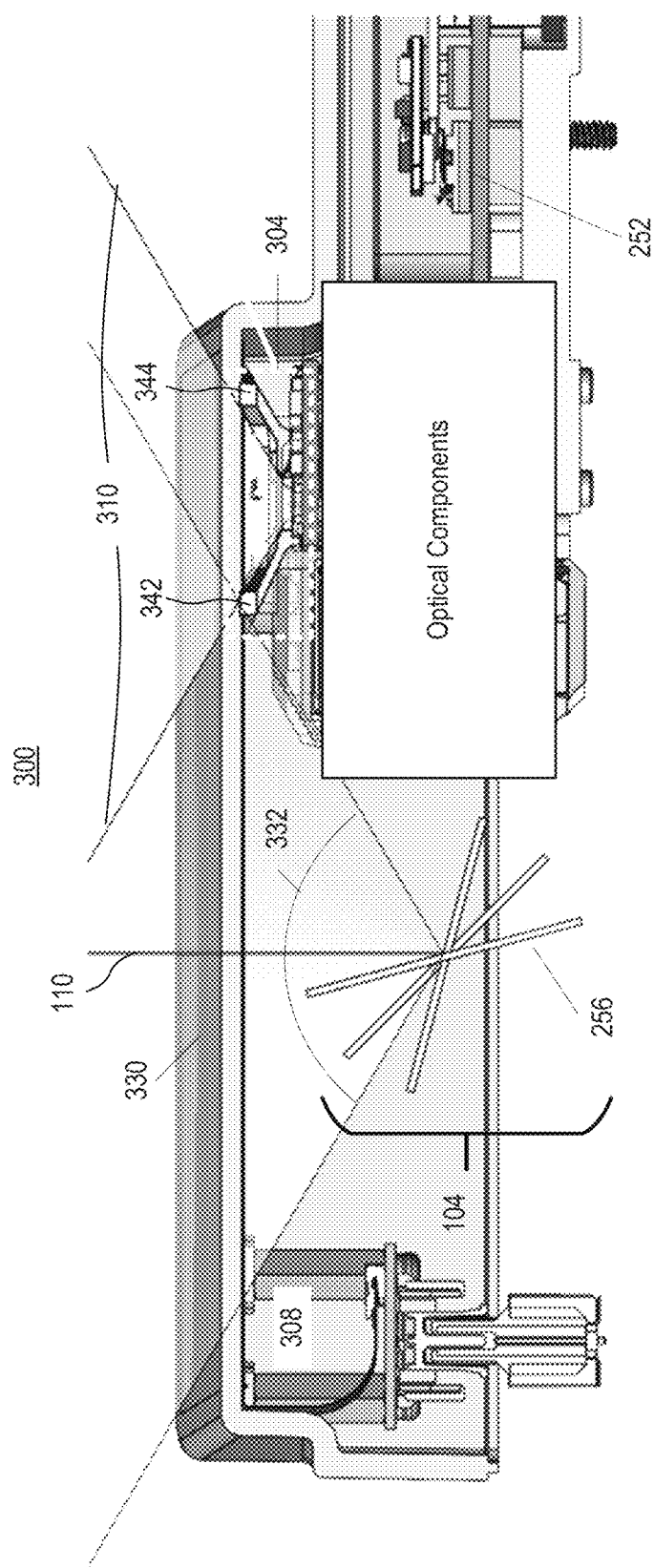
FIG. 3B shows a cross-sectional view of a portion of a hybrid LiDAR system, in accordance with some embodiments.

Referring to FIG. 3B, a cross-sectional view of a portion of one possible implementation of a hybrid LiDAR system 300 is shown. In the example of FIG. 3B, the far-field transmitter 104 includes an emitter 252, one or more optical components (e.g., lenses), and a movable mirror 256. The movable mirror 256 may be configured to scan the long-range beam 110 generated by the emitter 252 over the horizontal FOV 332 (e.g., 120 degrees). In some embodiments, the LiDAR system 300 may include an array of far-field transmitters 104 (e.g., 8, 16, 32, 64, or 128 far-field transmitters), each of which may horizontally scan a different portion of the system's vertical FOV (e.g., 32 degrees).

In the example of FIG. 3B, the far-field transmitter 104 is positioned below the near-field transmitter 304. In this example, the receiver 106 is not shown, but shares at least a portion of the optical path of the transmitter 104. Because the far-field emitter 252 is positioned relatively close to the receiver 106 and to one or more optical components (which may reflect portions of an illumination beam emitted by the far-field emitter 252), the dazzle produced by the far-field emitter 252 at the receiver 106 can be very strong. In contrast, any dazzle produced by the near-field transmitter 304 at the receiver 106 is much weaker, for at least two reasons. First, the receiver 106 and near-field transmitter 304 are located in separate, physically partitioned compartments, with baffles (342, 344) configured to limit optical communication between the compartments. This physical partitioning and optical shielding limit the amount of dazzle that might otherwise be produced by the emission of the line beam 310 from the short-range transmitter 304. Second, even if a small amount of light emitted by the short-range transmitter 304 reflects off the viewing window 330 of the LiDAR system 300 and is directed to the receiver 106, any dazzle produced by such internally reflected signals is relatively weak because such internally reflected signals are not directly incident on the receiver 106.

Figure 3C:
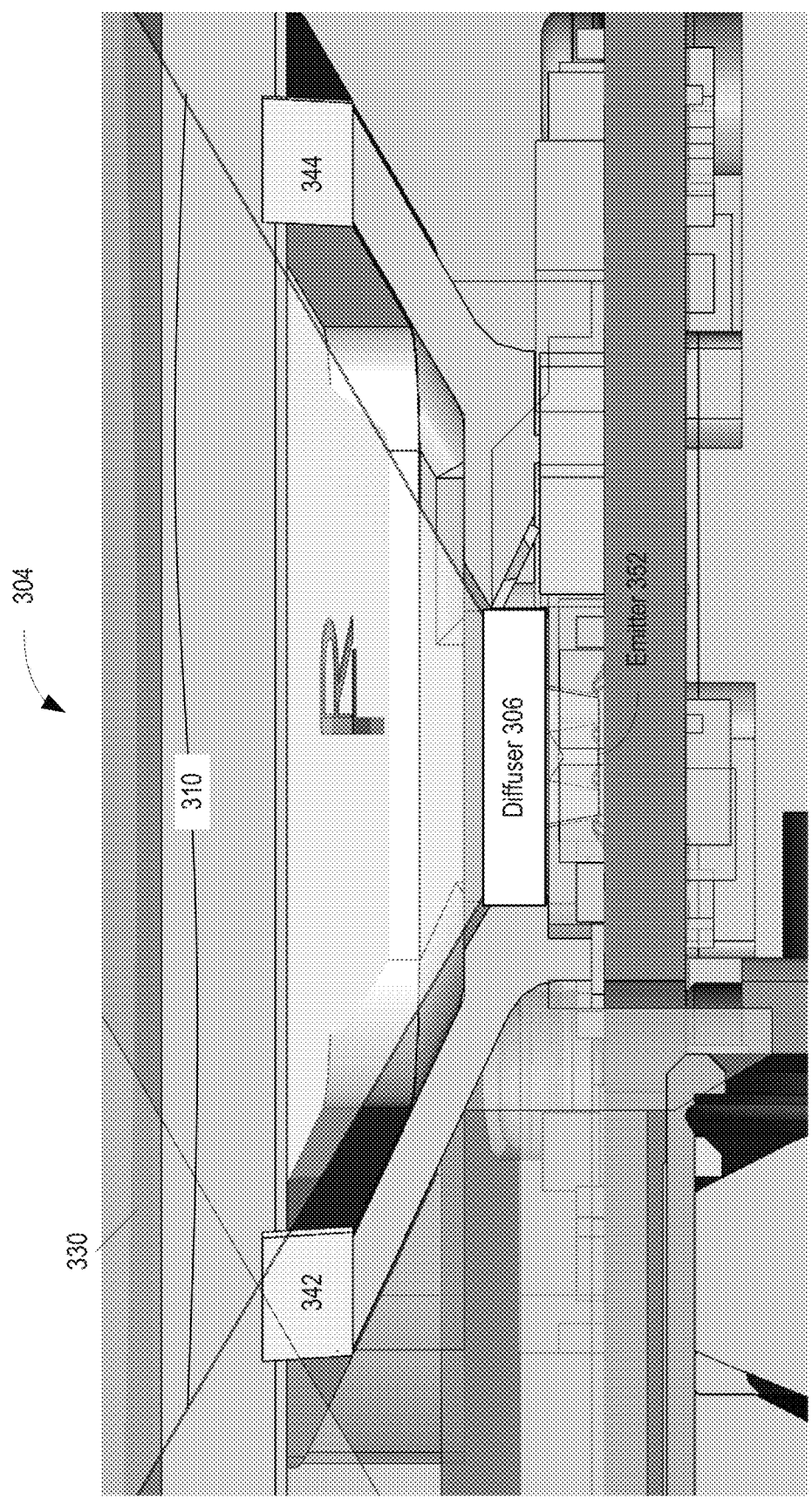
FIG. 3C shows a cross-sectional view of a short-range LiDAR transmitter, in accordance with some embodiments.

FIG. 3C shows a cross-sectional view of a near-field LiDAR transmitter 304, in accordance with some embodiments. As discussed above, the near-field transmitter 304 may include an emitter 352 and a diffuser 306. The emitter 352 may be, for example, a VCSEL. The VCSEL may emit a line beam perpendicular to the substrate of the chip in which the VCSEL is formed. In some embodiments, the beam emitted by the VCSEL is substantially symmetric and exhibits substantial divergence (e.g., 20 degrees by 20 degrees). In some embodiments, the VCSEL may emit a pulsed beam, with a pulse repetition frequency of approximately 200 kHz. Other pulse repetition frequencies (e.g., frequencies between 50 kHz and 500 kHz) are possible. In some embodiments, the emitted line beam is shaped by a diffuser 306. The diffuser 306 may be any suitable diffractive beam-shaping optical component. In some embodiments, the diffuser spreads the line beam 310 in the vertical and horizontal directions. In some embodiments, the divergence of the diffused line beam 310 may match the FOV of the LiDAR device 300 (e.g., 120 degrees by 32 degrees).

In some embodiments, the LiDAR system 100 includes one second transmitter 304. In some embodiments, the LiDAR system 100 includes one second transmitter 304 per array of first transmitters 104 (or array of first emitters) configured to scan different vertical regions of the system's FOV (e.g., array of 4, 8, 16, 32, or 64 transmitters or emitters). In some embodiments, the LiDAR system 100 includes one second transmitter 304 per first transmitter 104 (or emitter).

In some embodiments, the LiDAR system 100 activates a single receiver 106 to receive return signals in the short-range listening period after the transmitter 304 emits a laser signal 310. In such embodiments, the LiDAR system 100 may be able to detect the presence of an object within the near field, but may not be able to determine the precise location of the object (e.g., the vertical and horizontal coordinates of the object) within the FOV. In some embodiments, the LiDAR system 100 activates two or more receivers 106 (e.g., an array of 4, 8, 16, 32, or 64 receivers) to receive return signals in the short-range listening period after the transmitter 304 emits a laser signal 310. In such embodiments, the LiDAR system 100 may be able to detect the presence of an object within the near field, and able to determine at least the vertical coordinate(s) of the object within the FOV. In some embodiments, the LiDAR system 100 may activate the second transmitter once each time the system finishes scanning the entire FOV, once each time a first transmitter (or first emitter) finishes scanning a scan line (e.g., horizontal scan line) within the FOV, or once each time a first transmitter (or first emitter) scans a pixel within the FOV. Any of the foregoing configurations may be suitable for various applications of LiDAR system 100 (e.g., autonomous vehicle navigation).

Referring again to FIG. 3B, one of ordinary skill in the art will appreciate that the illustrated configuration of the near-field transmitter 304 may not provide full coverage of the LiDAR system's FOV at a range of 2 meters or less, because the near-field transmitter 304 is not positioned centrally with respect to the system's FOV. In some embodiments, the LiDAR system 300 may include a second near-field transmitter 304, which may be positioned proximate to location 308. Together, the illustrated near-field transmitter 304 and a second near-field transmitter positioned proximate to location 308 may provide full coverage of the system's FOV. In some embodiments, the two near-field transmitters may transmit pulses synchronously (e.g., with the two transmitters transmitting their pulses simultaneously or in an alternating sequence).

Advantageously, the timing of the firing of the transmitter 304 of the near-field LiDAR device with respect to the firing of the transmitter 104 of the far-field LiDAR device is selected, inter alia, to avoid dazzle interference. More particularly, the near-field transmitter 304 may be adapted to generate and emit a flash (e.g., illumination) signal 310 a predetermined amount of time before or after the generation and emission of light (e.g., illumination) signals 110 by the far-field transmitter 104.

Preferably, the flash signal 310 is emitted separately and distinctly from the (e.g., laser) light (e.g., illumination) signals 110 emitted by the transmitter 104 of the (e.g. primary) LiDAR device 102. Such emission may occur, for example, at the end of or at the beginning of every laser position (LPOS). Those of ordinary skill in the art can appreciate that the receiver 106 and control & data acquisition module 108 integrated into the LiDAR device 102, as well as the data analysis & interpretation module 109, may also be used to control the firing of the flash signals 310 by the (e.g., supplemental) transmitter 304 of the (e.g., secondary) flash LiDAR device 302 and to receive and process the return flash signals 314. Optionally, in some embodiments, the (e.g., secondary) flash LiDAR device 302 may be structured and arranged to include a separate receiver (not shown), control & data acquisition module (not shown), and/or data analysis & interpretation module (not shown).

In embodiments, aspects of the techniques described herein (e.g., timing the emission of the transmitted signal and the flash signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, a touchscreen, and/or a video display. The computing system may also include one or more buses operable to transmit communications between the various hardware components.

Figure 4:
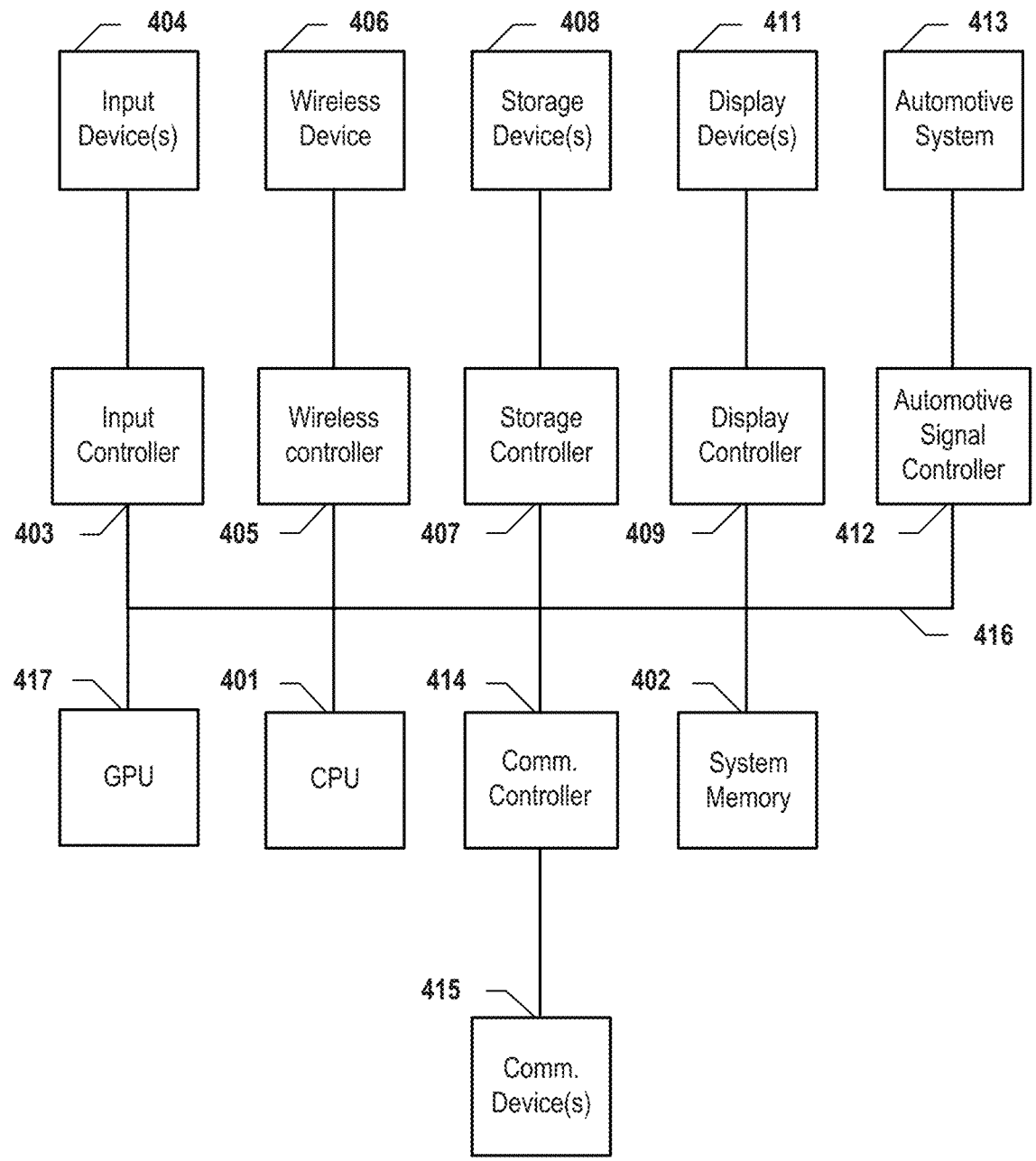
FIG. 4 shows a block diagram of a computing device/information handling system, in accordance with some embodiments.

FIG. 4 depicts a simplified block diagram of a computing device/information handling system (or computing system) according to embodiments of the present disclosure. It will be understood that the functionalities shown for system 400 may operate to support various embodiments of an information handling system—although it shall be understood that an information handling system may be differently configured and include different components.

As illustrated in FIG. 4, system 400 includes one or more central processing units (CPU) 401 that provide(s) computing resources and control(s) the computer. CPU 401 may be implemented with a microprocessor or the like, and may also include one or more graphics processing units (GPU) 417 and/or a floating point coprocessor for mathematical computations. System 400 may also include a system memory 402, which may be in the form of random-access memory (RAM), read-only memory (ROM), or both.

A number of controllers and peripheral devices may also be provided. For example, an input controller 403 represents an interface to various input device(s) 404, such as a keyboard, mouse, or stylus. There may also be a scanner controller 405, which communicates with a scanner 406. System 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the techniques described herein. Storage device(s) 408 may also be used to store processed data or data to be processed in accordance with some embodiments. System 400 may also include a display controller 409 for providing an interface to a display device 411, which may be a cathode ray tube (CRT), a thin film transistor (TFT) display, or other type of display. The computing system 400 may also include an automotive signal controller 412 for communicating with an automotive system 413. A communications controller 414 may interface with one or more communication devices 415, which enables system 400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

Method of Performing Short-Range Detection

Having described a hybrid LiDAR system 300 for compensating for dazzle in order to, inter alia, detect objects in the near field (e.g., within 1 or 2 meters of the system 300, i.e., within a short-range scan area that is spatially distant from the medium- and long-range scan areas), using a near-field transmitter 304 to match the FOV of the long-range channels, a method of detecting objects in a short-range scan area within the near field and mitigating the effects of dazzle will now be described. Two variations of methods of mitigating the effects of dazzle and detecting objects in a short-range scan area within the near field will now be described. The first technique involves one or more near-field transmitters 304 transmitting flash line (e.g., illumination) beam(s) 310 towards objects 312 in a short-range scan area within the near field prior to the time period corresponding to a laser position (LPOS) of the far-field transmitter 104, while the second technique involves a near-field transmitter(s) 304 transmitting flash line beam(s) 310 towards objects 312 in a short-range scan area within the near field at the end of the LPOS of the far-field transmitter 104. In both instances, the timing of the firing of the flash line (e.g., illumination) beam(s) 310 is controlled so that the short-range returns resulting from the flash line (e.g., illumination) beam(s) 310 are not affected by dazzle created by far-field transmitters 104.

Figure 5:
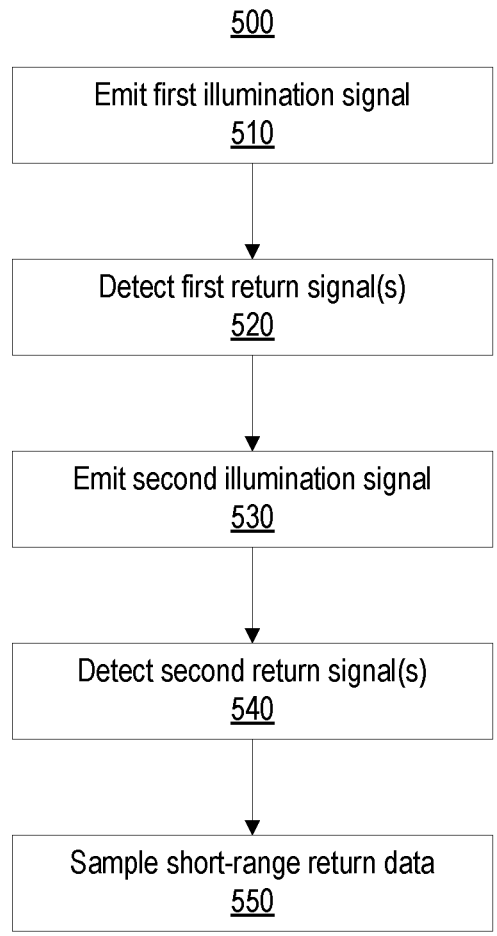
FIG. 5 shows a flow chart of a method of avoiding dazzle to detect (e.g., short-range) return signals of objects in a near field, in accordance with some embodiments.
Figure 6A:
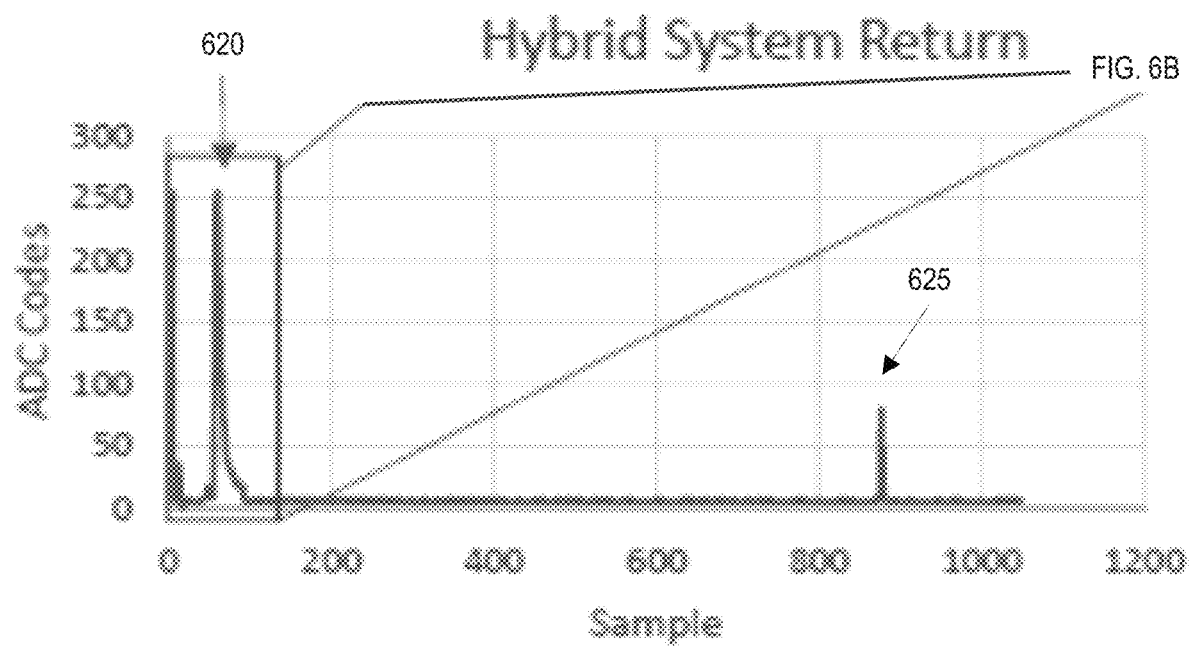
FIGS. 6A and 6B show illustrative examples of received return signals during a short-range sampling period occurring before dazzle occurs, in accordance with some embodiments.
Figure 6B:
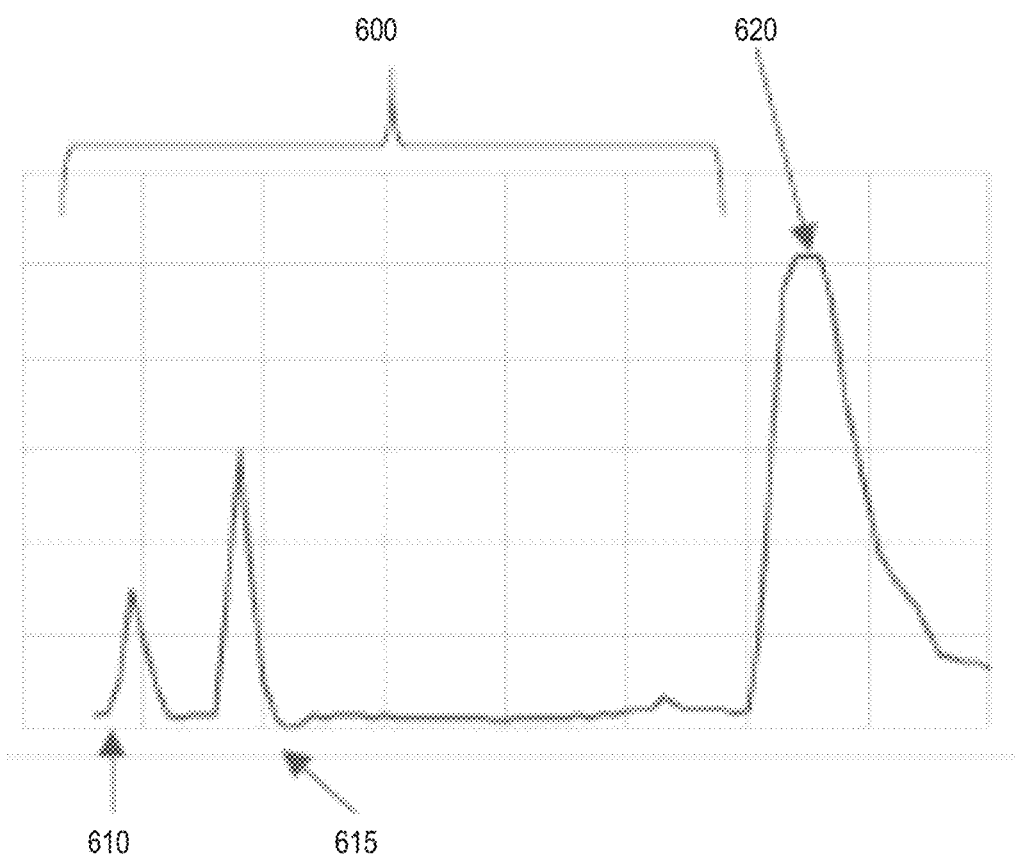

Referring to FIG. 5 and FIGS. 6A and 6B, according to the first technique, initially, the (e.g., medium- and long-range) transmitters 104 and supplemental (i.e., short-range) transmitters 304 are in an OFF state and the (e.g., long-range) channel detectors 106 in the LiDAR device 102 are focused on the near field. As previously mentioned, the detectors 106 may be integrated into each of the (e.g., primary) LiDAR device 102 and the flash (e.g., secondary) LiDAR device 302; however, to reduce space and cost, for the purpose of this description, it will be assumed that the medium- and long-range channel detectors 106 are integrated exclusively into the (e.g., primary) LiDAR device 102.

In a first embodiment of a method 500 for mitigating the effects of dazzle, at time $t_0$, the supplemental (i.e., short-range) transmitters 304 generate and emit (e.g., short-range) flash (e.g., illumination) signals 310 (act 510) towards objects 312 in a short-range scan area within the near field (e.g., between about 1 meter and 20 meters, or, more preferably, less than about 2 meters). The emitted flash signal 310 illuminates the object(s) 312 in short-range scan area within the near field and is reflected back towards the system 300 as a return flash signal 314 that, at time $t_1$, is received and detected (610, 615) by the channel detectors 106 (act 520) integrated into the (e.g., primary) LiDAR device 102. Subsequently, the primary (e.g., long-range) transmitters 104 generate and emit a laser light (e.g., illumination) signal 110 (act 530). The latter laser light (e.g., illumination) signal 110 causes, at time $t_2$, the detectors 106 integrated into the (e.g., primary) LiDAR device 102 to receive and detect a signal corresponding to dazzle 620. Subsequently, second return signals 114 from objects 112 in the medium- or long-range fields are received and detected 625 by the long-range channel detectors 106 (act 540). Advantageously, the return flash signals 314 are received and detected (610, 615) before the primary (e.g., long-range) transmitters 104 produce dazzle 620 that would otherwise blind the (e.g., long-range) channel detectors 106 while flash return signals 314 were reflected by (e.g., short-range) near-field objects 312. As a result, short-range, flash return data may be received, detected, and processed within a short-range sampling period 600 extending approximately from a time just after the flash signal 310 is emitted to a time just before the incidence of dazzle 620 (or just before the emission of the long-range signal 110) (act 550).

Figure 7A:
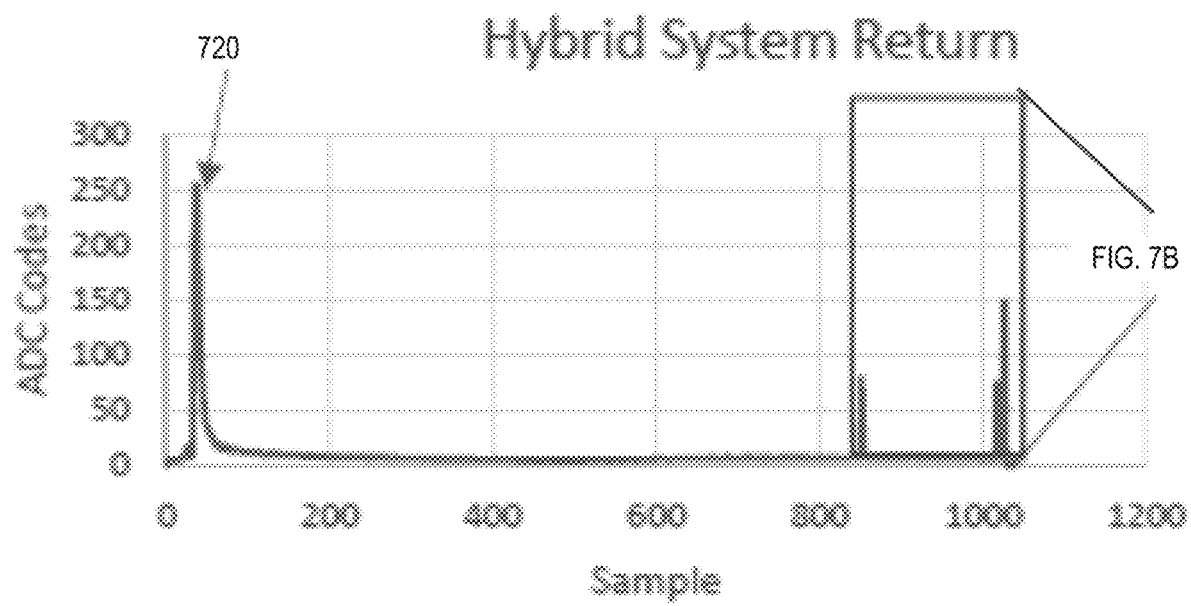
FIGS. 7A and 7B show illustrative examples of received return signals during a short-range sampling period occurring after receipt of the last (e.g., long-range) return signals, in accordance with some embodiments.
Figure 7B:
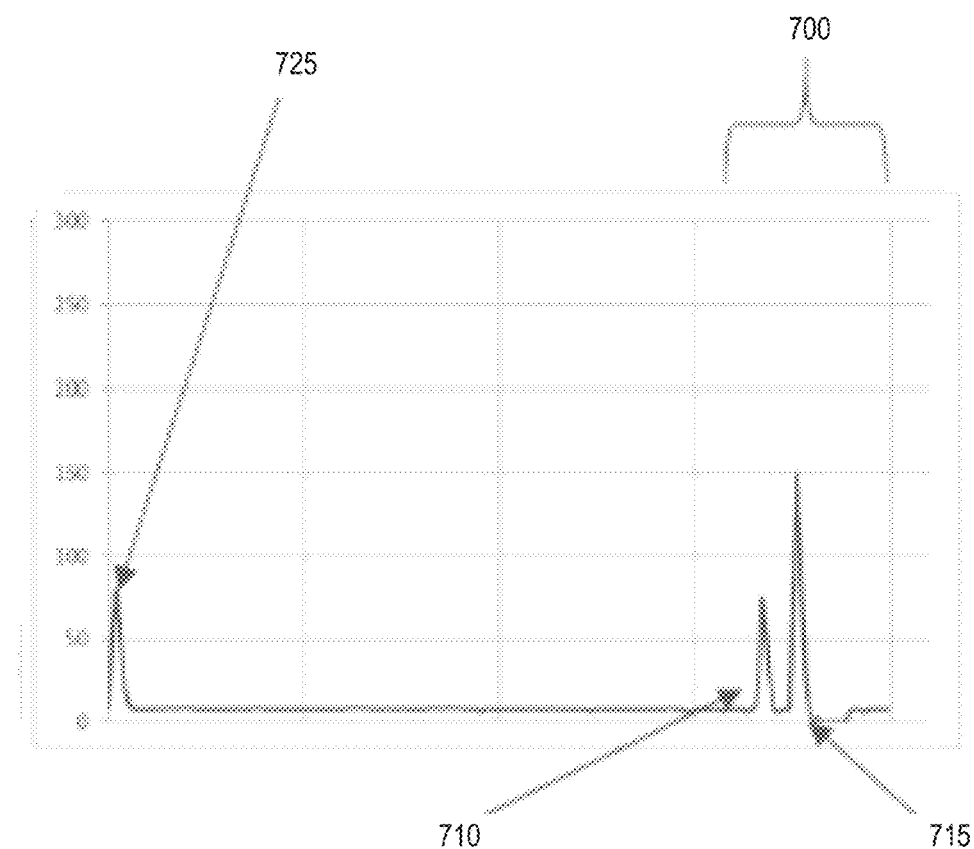

Referring to FIG. 5 and FIGS. 7A and 7B, according to the second technique (e.g., a second embodiment of the method 500 for mitigating the effects of dazzle), the primary (i.e., medium- and long-range) transmitter 104 generates and emits a light (e.g. illumination) signal 110 (act 510) towards objects 112 in the medium- and long-range environment. The emitted light (e.g., illumination) signal 110 illuminates objects 112 in the medium- and long-range environment and is reflected back towards the system 300 as return signals 114 that are received and detected 725 by the long-range channel detectors 106 (act 520). After the last return signal 114 is received 725 by the long-range channel detectors 106, the supplemental (e.g., short-range) transmitter 304 generates and emits a (e.g., short-range) flash light (e.g., illumination) signal 310 (act 530) towards a short-range scan area within the near field. Subsequently, return flash signals 314 from objects 312 in the short-range scan area within the near fields are received and detected (710, 715) by the long-range channel detectors 106 (act 540). Advantageously, the return flash signals 314 are received and detected (710, 715) after the last return signal 114 produced by the primary (e.g., medium- and long-range) transmitter 104 are received 725 (see act 520), as well as after any dazzle 720 produced by back-reflecting resulting from the firing of the primary (e.g., medium- and long-range) transmitter 104. Advantageously, the return flash signals 314 are received and detected (710, 715) after any dazzle that would otherwise blind the long-range channel detectors 106. As a result, (e.g., short-range) flash return data may be received, detect, and processed within a short-range sampling period 700 extending approximately from the end of the listening period for the medium- and long-range returns (e.g., a period beginning when the primary transmitter 104 emits the signal 110 and having a duration approximately equal to the round-trip travel time for a signal to reach an object at the edge of the LiDAR system's long-range and for the reflected return signal 114 to travel back from that object to the LiDAR system) to the end of the listening period for the short-range returns (e.g., a period beginning when the secondary transmitter 304 emits the signal 310 and having a duration approximately equal to the round-trip travel time for a signal to reach an object at the edge of the LiDAR system's short-range and for the reflected return signal 314 to travel back from that object to the LiDAR system).

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A light detection and ranging (LiDAR) system comprising:
    a first transmitter adapted to generate and emit a first light illumination signal into a long-range scan area at a first degree of divergence;
    a second transmitter adapted to generate and emit a second light illumination signal into a short-range scan area at a second degree of divergence greater than the first degree of divergence;
    a receiver comprising an optical detector adapted to receive first return signals corresponding to light from the first light illumination signal reflected from surfaces within the long-range scan area and to receive second return signals corresponding to light from the second light illumination signal reflected off surfaces within the short-range scan area; and
    circuitry configured to: (i) during a first time period, fire the first transmitter to generate the first light illumination signal and receive and detect the first return signals by the optical detector, and (ii) during a second time period, fire the second transmitter to generate the second illumination signal and receive and detect the second return signals by the optical detector, wherein the first and second time periods are non-overlapping.

2. The system of claim 1, wherein the short-range scan area is spatially distant from the long-range scan area.

3. The system of claim 1 wherein the circuitry is configured to time firing of the second transmitter such that short-range returns resulting from the pulses of light generated by the second transmitter are not affected by dazzle created by the first transmitter.

4. The system of claim 3 further comprising a data analysis and interpretation module structured and arranged to process data received from the receiver.

5. The system of claim 1, wherein the second transmitter comprises at least one vertical-cavity surface-emitting laser (VCSEL).

6. The system of claim 1, wherein the range of the second light illumination signal is between about 10 meters and about 20 meters.

7. The system of claim 1, wherein the range of second light illumination signal is less than about 2 meters.

8. The system of claim 1, wherein the range of the second light illumination signal is between about 1 meter and about 20 meters.

9. The system of claim 1 further comprising a diffuser disposed between the second transmitter and the short-range scan area.

10. The system of claim 1, wherein the second transmitter comprises a baffle configured to reduce transmission of light from the second transmitter to the receiver along an optical path internal to the LiDAR system.

* * * * *